Oct. 25, 1966

H. J. BROWN 3,281,716

TRANSISTOR POWER SUPPLY

Filed Jan. 15, 1965

INVENTOR.
Harold J. Brown,
BY
H. H. Losche
Paul S. Collignon
Att'ys.

United States Patent Office
3,281,716
Patented Oct. 25, 1966

3,281,716

TRANSISTOR POWER SUPPLY

Harold J. Brown, 6947 College Ave., Indianapolis, Ind.

Filed Jan. 15, 1965, Ser. No. 425,970
2 Claims. (Cl. 331—113)

The invention described herein may be manufactured and used by or for the Government of the United States of America for governmental purposes without the payment of any royalties thereon or therefor.

The present invention relates to a circuit for converting direct current power to alternating current power, and more particularly to a circuit that will naturally protect the main power transistors from energy inputs that will limit their life.

In the voltage converter art, transistors have been used as switches to switch a direct current energy source in an alternating polarity to a transformer. The transistors were initially used in a saturable transformer circuit in which the power transformer was driven into saturation, thus switching the transistors and providing a mechanism for power conversion.

One such circuit is shown in U.S. Patent 2,849,614, which issued August 26, 1958, to George H. Royer and Richard L. Bright. In this patented circuit, an electrical inverter circuit is provided for inverting a unidirectional voltage supplied by a battery. The circuit includes translating means in the form of a magnetic core and in order to permit magnetization of the core, suitable input winding means are provided to link the core. An output winding also links the core in inductive relation with the input winding means for supplying an alternating output quantity to a pair of output terminals. In order to permit magnetization of the core in accordance with current from the battery for causing the induction of an alternating output voltage in the output winding, the input winding means is in two sections, each having an equal number of turns. A pair of transistors is provided, each being connected to a separate section to provide two current paths from the battery. The transistors are biased so as to operate as controlled switch devices with each transistor having a closed operating condition wherein the transistor exhibits a very low impedance condition between the emitter and collector electrodes, and an open operating condition wherein the transistor exhibits a very high impedance condition between the emitter and collector electrodes. In order to control operation of the two transistors, suitable control means are provided to establish opposing conducting conditions of the transistors. The control means is further effective to reverse the conducting conditions of the transistors in response to each occurrence of saturation of the core.

While the above-described circuit adequately provides the desired converter function, the transistors are particularly susceptible to damage and transistor failures are commonplace. In order to overcome the problem of destruction of transistors, the transistors are very frequently operated below their rated capabilities.

It is a purpose of the present invention to provide a converter circuit that can utilize transistors at their full rating. In the present invention, a direct current energy source is alternately connected into first and second input windings of a transformer through first and second switches, such as transistors. Power is delivered to a load from the secondary winding of the transformer. Separate means are provided for opening the switch that is closed, or turning off the transistor that is on, for holding both off for a predetermined interval of time, and then for turning on the transistor that was not last on. The circuit is provided with means that prevent energy dissipation when either of the switches is opened, and by providing for an interval of time for both switches to be opened, there is no dissipation of energy when either of the switches is closed.

It is therefore a general object of the present invention to provide an improved electrical inverter circuit.

Another object of the present invention is to provide a reliable transistor circuit for converting direct current to alternating current.

Still another object of the present invention is to provide an inverter circuit that allows efficient and natural operation of transistors.

A still further object of the present invention is to provide an inverter circuit that utilizes transistors at their full rating.

Yet another object of the present invention is to provide an inverter circuit that utilizes transistors at the highest possible frequency.

Other objects and advantages of the present invention will be readily appreciated as the same becomes better understood by reference to the following detailed description when considered in connection with the accompanying drawings wherein.

Figure 1:
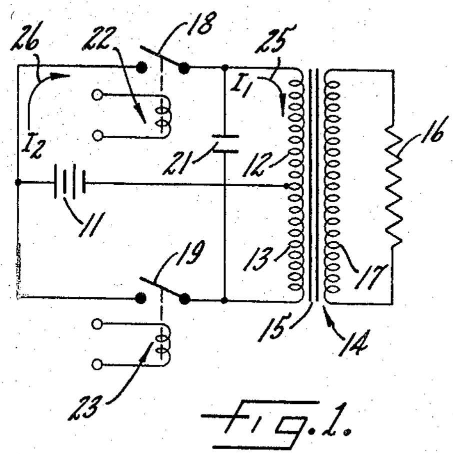
FIGURE 1 is a diagrammatic view of a circuit illustrating the general principles of the present invention.

Referring now to the drawing, there is illustrated in FIGURE 1 an inverter circuit for alternately connecting a direct current source, represented by battery 11, to input windings 12 and 13 of a transformer 14. Windings 12 and 13 are wound on magnetic core 15, and a load 16 is connected to the secondary winding 17 of transformer 14. A first switch 18 is connected between one terminal of battery 11 and one end of winding 12, and a second switch 19 is connected between the same terminal of battery 11 and one end of winding 13. The other ends of windings 12 and 13 are connected to the other terminal of battery 11. Capacitor 21 is shunted across windings 12 and 13. Control means 22 is provided for opening and closing switch 18 and, likewise, control means 23 is provided for opening and closing switch 19.

Figure 2:
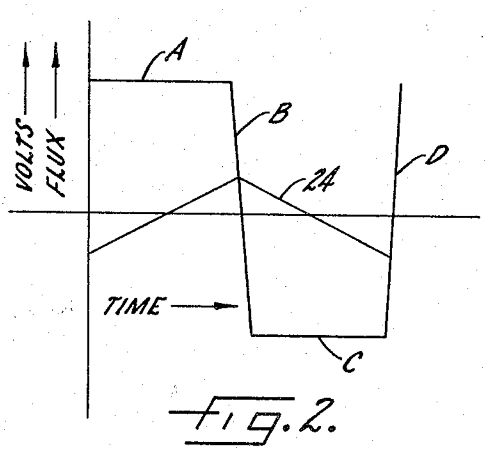
FIGURE 2 is a graphical representation showing an ideal cycle of operation of the present invention.

Referring specifically to FIGURES 1 and 2 of the drawing, battery 11 establishes voltage "A" across transformer 14 upon the closing of switch 18 by control means 22. The opening of switch 18 by control means 22, while switch 19 is still opened, results in voltage "B," which is the voltage response of transformer 14 and capacitor 21. The closing of switch 19 by control means 23, while switch 18 is open, establishes voltage "C." The opening of switch 19 by control means 23, while switch 18 is still opened, results in voltage "D," which is the voltage response of transformer 14 and capacitor 21.

Transformer 14 generates a counter electromotive force to oppose the applied electromotive force, by virtue of a magnetic flux change linking the turns of transformer 14. Curve 24 of FIGURE 2 represents the magnetic flux variation in core 15 of transformer 14. With reference to FIGURE 1 of the drawing, and assuming load 16 disconnected, arrow 25 indicates the flow of current $I_1$ circulating in capacitor 21 and input windings 12 and 13. Current $I_1$ will only circulate during the time interval when switches 18 and 19 are both open. Magnetizing current $I_2$, which is represented by arrow 26, and which is provided by battery 11, is replaced by current $I_1$ upon the opening of switch 18. By maintaining a short disconnect time for switch 18, there will not be any energy dissipation in switch 18, under the assumed ideal conditions.

As current through an inductance will show little change during a short period of time, voltage across capacitor 21 will change as indicated by voltage "B" in FIGURE 2, thus changing the voltage polarity. By closing switch 19 at the time at which the voltage of transformer 14 equals the voltage of battery 11, there will not be any energy dissipated in switch 19. Switch 19 is maintained closed for the same time duration as switch 18 was closed. By providing capacitor 21, no voltages appear across switches 18 and 19 when these switches are opening and thus there is no energy dissipation in the switches. Also, by providing an interval of time when both switches are simultaneously opened, there is not any dissipation of energy upon closing the switches.

Figure 3:
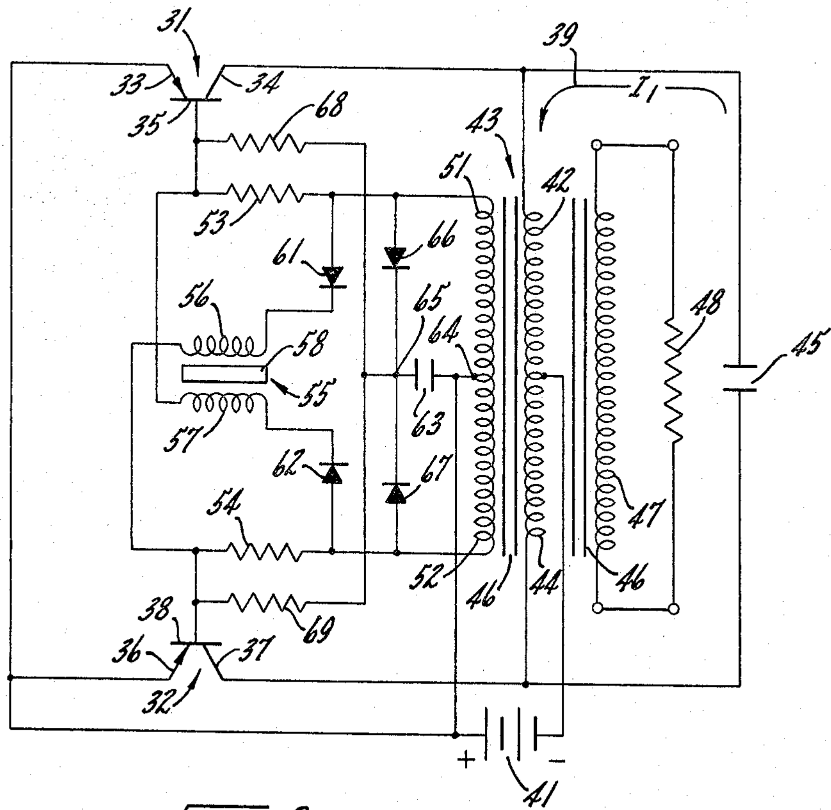
FIGURE 3 is a circuit diagram showing a preferred embodiment of the present invention.

Referring now to FIGURE 3 of the drawing, there is shown an inverter circuit in which transistors 31 and 32 are used for switches 18 and 19 of FIGURE 1. The emitter electrode 33 of transistor 31 and the emitter electrode 36 of transistor 32 are connected to the positive terminal of battery 41, with the collector electrode 34 of transistor 31 being connected to one end of input winding 42 of transformer 43 and the collector electrode 37 of transistor 32 being connected to one end of input winding 44 of transformer 43. The other ends of input windings 42 and 44 are connected to the negative terminal of battery 41. Capacitor 45 is shunted across the ends of windings 42 and 44. Windings 42 and 44 are wound on magnetic core 46 and secondary winding 47, which is wound on core 46, provides alternating current to load 48. Transformer 43 is also provided with base drive windings 51 and 52 which cause transistor bases 35 and 38 to be energized through base drive resistors 53 and 54, respectively.

A saturable core switch 55, having turn-off windings 56 and 57 wound on a saturable core 58, is provided. Diode 61, which is connected between one end of winding 56 and one end of input winding 51, and diode 62, which is connected between one end of winding 57 and one end of input winding 52, are provided to select the appropriate windings on saturable switch 55. The other end of winding 56 is connected to the base electrode 38 of transistor 32, and the other end of winding 57 is connected to the base electrode 35 of transistor 31. A capacitor 63 is connected between junction point 64, which is common to one end of winding 51 and one end of winding 52, and junction point 65. Diode 66, which has one terminal connected to one end of winding 51 and one terminal connected to junction point 65, and diode 67, which has one terminal connected to one end of winding 52 and one terminal connected to junction point 65, are provided to assure a positive voltage on capacitor 63. Capacitor 63, in turn, provides a positive current through resistors 68 and 69 to transistors 31 and 32, respectively, for purpose of holding.

In operation, assuming that transistor 31 is conducting and that transistor 32 is blocking, positive voltage will be applied to input winding 42 from battery 41 and the negative voltage from base drive winding 51 provides negative current through resistor 53 to the base 35 of transistor 31. As shown in FIGURE 2 of the drawing, voltage "A" is provided. As base 35 is near emitter potential, a small positive current will flow through diode 62 and winding 57 of saturable core switch 55 from winding 52 and thus provide a flux reset in saturable core switch 55. The current flowing through winding 57, however, is small compared to the base drive current flowing through resistor 53, and transistor 31 will continue to conduct. The positive voltage from winding 52 through resistor 54 will cause transistor 32 to block. The small positive current passing through winding 57 of saturable core switch 55 will, however, cause saturable core switch 55 to become saturated and, in effect, saturable core switch 55 will be "closed" to pass the full value of positive current from winding 52 to the base electrode 35 of transistor 31 whereupon transistor 31 will stop conducting and block. Both transistors 31 and 32 are now "off," or blocking, and the voltage "B" shown in FIGURE 2 of the drawing will be developed across transformer 43. As the base drive voltages from windings 51 and 52 approach zero values during the dynamical voltage response "B," transistors 31 and 32 are held in the blocking, or "off," condition by positive current from capacitor 63 which flows through resistors 68 and 69 to base electrodes 35 and 38, respectively. The interaction of transformer 43 and capacitor 45, with the resultant current flow $I_1$ shown by arrow 39, causes voltage response "B" to reverse the polarity across transformer 43.

As the dynamical voltage response "B" approaches the opposite polarity, negative current from winding 52 will flow through base drive resistor 54 to cause transistor 32 to conduct. This results in voltage response "C" and upon initiation of voltage response "C," flux change in an opposite direction will occur in transformer 43 and in saturable core switch 55 as current flows from winding 51 through diode 61 and winding 56 of saturable core switch 55. The current flowing through winding 56 will again cause saturable core switch 55 to become saturated and, in effect, "close" switch 55 to allow the full passage of current from winding 51 through diode 61 and winding 56 to the base electrode 38 of transistor 32. Transistor 32 will then be cut "off," or caused to block, which will then result in the development of voltage response "D," as shown in FIGURE 2 of the drawing. Transistors 31 and 32 are again both blocking and are held in this condition by the current from capacitor 63 which flows through resistors 68 and 69 to base electrodes 35 and 38, respectively. Thus the ideal cycle shown in FIGURE 2 of the drawing has been achieved by the circuit shown in FIGURE 3 of the drawing.

It can thus be seen that the present invention provides an improved system of using transistors in an inverter circuit and, in actual operation, transistors can be utilized at their full rated capabilities without fear of damaging or destroying the transistors.

Obviously many modifications and variations of the present invention are possible in the light of the above teachings. It is therefore to be understood, that within the scope of the appended claims, the invention may be practiced otherwise than as specifically described.

What is claimed is:

1. An inverter circuit comprising:

first and second output terminals, a transformer having a first winding provided with a center tap, a secondary winding of the ends of which are coupled one each to said first and second output terminals, and a third winding provided with a center tap, a direct current voltage source having first and second terminals, said first terminal being connected to said center tap of said first winding, first and second transistors each having base, collector and emitter electrodes, said collectors of said transistors being connected one each to each end of said first winding, said emitters being connected to said second terminal of said voltage source, said base electrode of said first transistor being connected to a first end of said third winding and said base electrode of said second transistor being connected to a second end of said third winding, first and second rectifiers, means for separately cutting off said first and second transistors comprising a saturable core switch having first and second core windings, said first core winding having one end coupled through said first rectifier to said first end of said third winding and the other end of said first core winding being connected to said base electrode of said second transistor, and said second core winding having one end coupled through said second rectifier to said second end of said third winding and the other end of said second core winding being connected to said base electrode of said first transistor, and a capacitor having one terminal connected to the center tap of said third winding and the other terminal connected to said base electrodes of said first and second transistors.

2. An inverter circuit as set forth in claim 1 wherein a capacitor is shunted across the ends of said first winding of said transformer.

References Cited by the Examiner

UNITED STATES PATENTS

| | | | |
|---|---|---|---|
| 3,161,837 | 12/1964 | Lloyd | 331—113 |
| 3,181,053 | 4/1965 | Amato | 321—2 |

References Cited by the Applicant

UNITED STATES PATENTS

| | | |
|---|---|---|
| 2,774,878 | 12/1956 | Jensen. |
| 2,849,614 | 8/1958 | Royer et al. |
| 3,008,068 | 11/1961 | Wilting et al. |

ROY LAKE, *Primary Examiner*.

J. KOMINSKI, *Assistant Examiner*.